(12) United States Patent
Dittrich et al.

(10) Patent No.: US 11,738,429 B2
(45) Date of Patent: Aug. 29, 2023

(54) FASTENER DRIVING TOOL

(71) Applicant: HILTI AKTIENGESELLSCHAFT, Schaan (LI)

(72) Inventors: Tilo Dittrich, Feldkirch (AT); Peter Bruggmueller, Bludesch (AT); Chafic Abu Antoun, Buchs (CH)

(73) Assignee: Hilti Aktiengesellschaft, Schaan (LI)

( * ) Notice: Subject to any disclaimer, the term of this patent is extended or adjusted under 35 U.S.C. 154(b) by 353 days.

(21) Appl. No.: 17/056,718

(22) PCT Filed: May 29, 2019

(86) PCT No.: PCT/EP2019/063915
§ 371 (c)(1),
(2) Date: Nov. 18, 2020

(87) PCT Pub. No.: WO2019/233840
PCT Pub. Date: Dec. 12, 2019

(65) Prior Publication Data
US 2021/0197351 A1    Jul. 1, 2021

(30) Foreign Application Priority Data
Jun. 6, 2018 (EP) .................................... 18176198

(51) Int. Cl.
*B25C 1/06* (2006.01)
*H02K 17/16* (2006.01)
(Continued)

(52) U.S. Cl.
CPC ............. *B25C 1/06* (2013.01); *H02K 17/165* (2013.01); *H02K 41/02* (2013.01); *H02K 7/145* (2013.01); *H02K 41/0356* (2013.01)

(58) Field of Classification Search
CPC .......... B25C 1/06; B25C 1/00; H02K 17/165; H02K 17/20; H02K 7/145; H02K 15/0012
See application file for complete search history.

(56) References Cited

U.S. PATENT DOCUMENTS

| 6,830,173 | B2 | 12/2004 | Barber et al. |
| 2003/0183670 | A1* | 10/2003 | Barber ..................... B25C 1/06 227/131 |

(Continued)

FOREIGN PATENT DOCUMENTS

| CN | 107534319 A | 1/2018 |
| EP | 0829329 A1 | 3/1998 |

(Continued)

OTHER PUBLICATIONS

International Bureau, International Search Report in International Application No. PCT/EP2019/063915, dated Aug. 8, 2019.

*Primary Examiner* — Anna K Kinsaul
*Assistant Examiner* — Veronica Martin
(74) *Attorney, Agent, or Firm* — Leydig, Voit & Mayer, Ltd.

(57) ABSTRACT

A tool comprising a drive-in element, transferring a fastening element into a substrate along setting axis by a setting energy $E_{kin}$, a drive for driving the drive-in element along the setting axis, the drive comprising a capacitor, a rotor, and a coil, wherein current flows through the coil generating a magnetic field accelerating the drive-in element toward the fastening element, wherein a current intensity $A_{coil}$ of current flowing through the excitation coil while discharging the capacitor has a time profile with a rising edge, a maximum current intensity $A_{max}$ and a falling edge, $A_{coil}$ rising during current rise time $\Delta t_{rise}$ from 0.1 to 0.8 times $A_{max}$ and during impact time $\Delta t_{impact}$ is more than 0.5 times (Continued)

Figure 1:
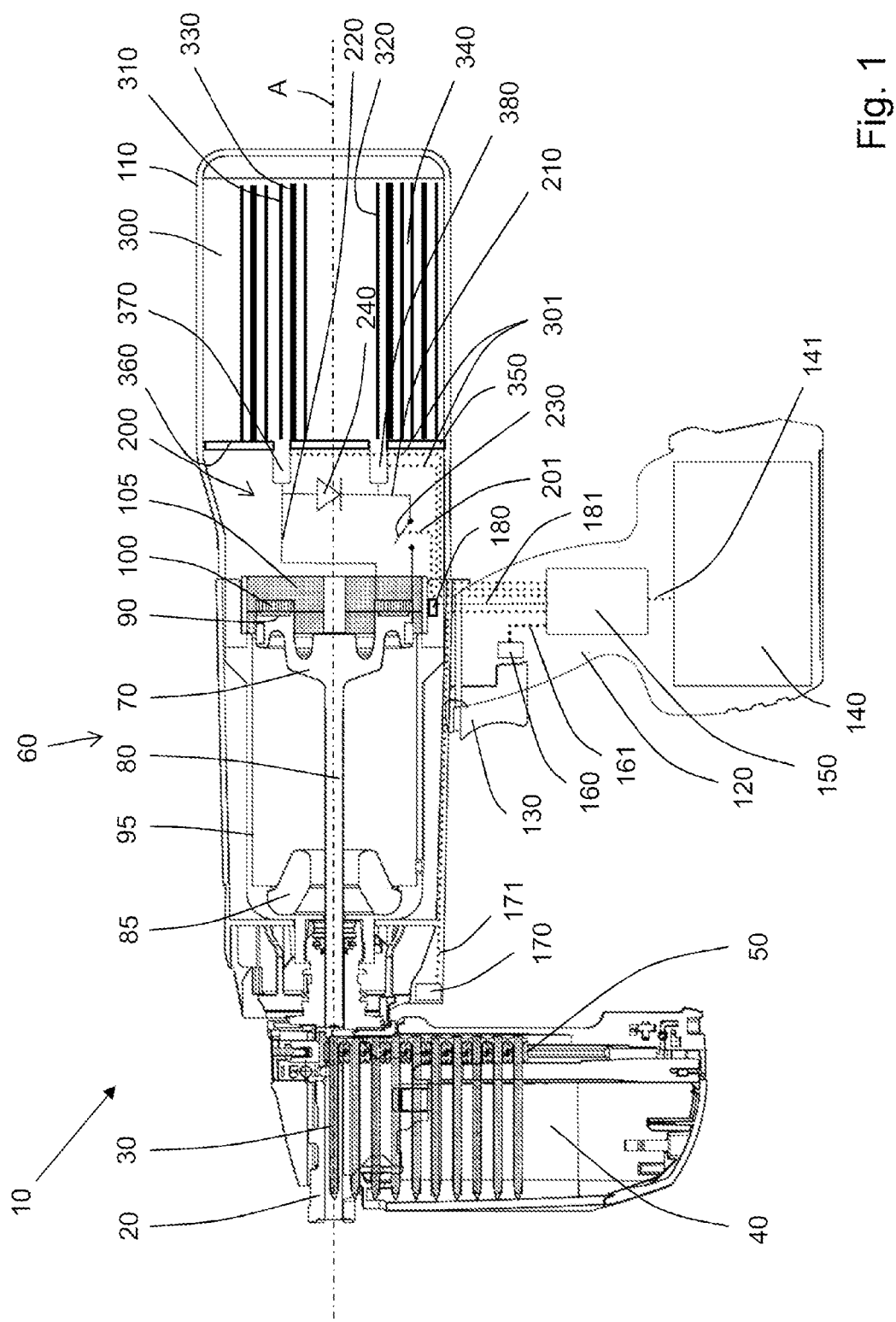

the $A_{max}$, wherein $\Delta t_{rise}$ is at least 0.020 ms and at most 0.275 ms and/or the impact time $\Delta t_{impact}$ is at least 0.15 ms and at most 2.0 ms.

20 Claims, 4 Drawing Sheets

(51) Int. Cl.
  *H02K 41/02* (2006.01)
  *H02K 7/14* (2006.01)
  *H02K 41/035* (2006.01)

(56) References Cited

U.S. PATENT DOCUMENTS

| | | | |
|---|---|---|---|
| 2010/0213232 A1 | 8/2010 | Krondorfer et al. | |
| 2012/0138655 A1* | 6/2012 | Grandjean | B25C 1/08 60/633 |
| 2018/0090996 A1 | 3/2018 | Kitamura et al. | |
| 2019/0229597 A1* | 7/2019 | Büttner | H02K 15/0012 |

FOREIGN PATENT DOCUMENTS

| | | |
|---|---|---|
| JP | S50-150975 A | 4/1975 |
| JP | S52-80373 A | 7/1977 |
| JP | S53-15184 A | 2/1978 |
| JP | S54-7477 U | 1/1979 |
| JP | S54-119075 U | 8/1979 |
| JP | 2004-510590 A | 4/2004 |
| TW | 201039986 A | 11/2010 |

\* cited by examiner

FASTENER DRIVING TOOL

CROSS-REFERENCE TO RELATED APPLICATIONS

This patent application is the U.S. National Stage of International Patent Application No. PCT/EP2019/063915, filed May 29, 2019, which claims the benefit of European Patent Application No. 18176198.2, filed Jun. 6, 2018, which are each incorporated by reference.

The present invention relates to a setting tool for driving fastening elements into a substrate.

Such setting tools usually have a holder for a fastening element, from which a fastening element held therein is transferred into the substrate along a setting axis. For this, a drive-in element is driven toward the fastening element along the setting axis by a drive.

U.S. Pat. No. 6,830,173 B2 discloses a setting tool with a drive for a drive-in element. The drive has an electrical capacitor and a coil. For driving the drive-in element, the capacitor is discharged via the coil, whereby a Lorentz force acts on the drive-in element, so that the drive-in element is moved toward a nail.

The object of the present invention is to provide a setting tool of the aforementioned type with which high efficiency and/or good setting quality are ensured.

The object is achieved by a setting tool for driving fastening elements into a substrate, comprising a holder, which is provided for holding a fastening element, a drive-in element, which is provided for transferring a fastening element held in the holder into the substrate along a setting axis by a setting energy $E_{kin}$, and a drive, which is provided for driving the drive-in element toward the fastening element along the setting axis, wherein the drive comprises an electrical capacitor, a squirrel-cage rotor arranged on the drive-in element and an excitation coil, which during discharge of the capacitor is flowed through by current and generates a magnetic field that accelerates the drive-in element toward the fastening element, wherein a current intensity $A_{coil}$ of the current flowing through the excitation coil during the discharge of the capacitor has a time profile with a rising edge, a maximum current intensity $A_{max}$ and a falling edge, wherein the current intensity $A_{coil}$ rises during a current rise time $\Delta t_{rise}$ from 0.1 times to 0.8 times the maximum current intensity $A_{max}$ and during an impact time $\Delta t_{impact}$ is more than 0.5 times the maximum current intensity $A_{max}$, and wherein the current rise time $\Delta t_{rise}$ is at least 0.020 ms and at most 0.275 ms and/or the impact time $\Delta t_{impact}$ is at least 0.15 ms and at most 2.0 ms. The setting tool can in this case preferably be used in a hand-held manner. Alternatively, the setting tool can be used in a stationary or semi-stationary manner.

In the context of the invention, a capacitor should be understood as meaning an electrical component that stores electrical charge and the associated energy in an electrical field. In particular, a capacitor has two electrically conducting electrodes, between which the electrical field builds up when the electrodes are electrically charged differently. In the context of the invention, a fastening element should be understood as meaning for example a nail, a pin, a clamp, a clip, a stud, in particular a threaded stud, or the like.

An advantageous embodiment is characterized in that the current rise time $\Delta t_{rise}$ is at least 0.05 ms and at most 0.2 ms. A further advantageous embodiment is characterized in that the impact time $\Delta t_{impact}$ is at least 0.2 ms and at most 1.6 ms.

An advantageous embodiment is characterized in that a maximum current density in the excitation coil during the discharge of the capacitor is at least 800 A/mm² and at most 3200 A/mm².

An advantageous embodiment is characterized in that the capacitor and the excitation coil are arranged in an electrical oscillating circuit, and wherein the capacitor has a capacitance $C_{cap}$ and a capacitor resistance $R_{cap}$, the excitation coil has a self-inductance $L_{coil}$ and a coil resistance $R_{coil}$ and the electrical oscillating circuit has a total resistance $R_{total}$. A ratio of the capacitor resistance $R_{cap}$ to the total resistance $R_{total}$ is preferably at most 0.6, particularly preferably at most 0.5. Likewise preferably, a ratio of the self-inductance $L_{coil}$ to the coil resistance $R_{coil}$ is at least 800 µH/Ω and at most 4800 µH/Ω. Likewise preferably, the capacitor has a capacitor time constant $\tau_{cap}=C_{cap}\,R_{cap}$ and the excitation coil has a coil time constant $\tau_{coil}=L_{coil}/R_{coil}$, wherein a ratio of the coil time constant $\tau_{coil}$ to the capacitor time constant $\tau_{Cap}$ is at least 10, that is to say that the coil time constant $\tau_{coil}$ is at least 10 times the capacity time constant $\tau_{cap}$.

An advantageous embodiment is characterized in that the drive-in element is provided for transferring a fastening element held in the holder into the substrate with a setting energy $E_{kin}$ of at least 30 J and at most 600 J, wherein the drive-in element has a piston diameter $d_K$ and a piston mass $m_K$ and wherein, for the piston diameter $d_K$ $$\frac{2}{3}(a+bE_{kin}^n) \leq d_K \leq \frac{4}{3}(a+bE_{kin}^n)$$

where a=33 mm, b=6 mmJ$^{-n}$ and n=⅓ and/or, for the piston mass $m_K$, $$\frac{2}{3}(c+dE_{kin}^n) \leq m_K \leq \frac{5}{3}(c+dE_{kin}^n)$$

where c=20 g, d=30 gJ$^{-n}$ and n=⅓. In the context of the invention, the piston diameter $d_K$ should be understood as meaning the greatest extent of the drive-in element perpendicularly to the setting axis. In the case of a circular-cylindrical drive-in element or piston plate, this is the diameter of the cylinder.

Figure 2:
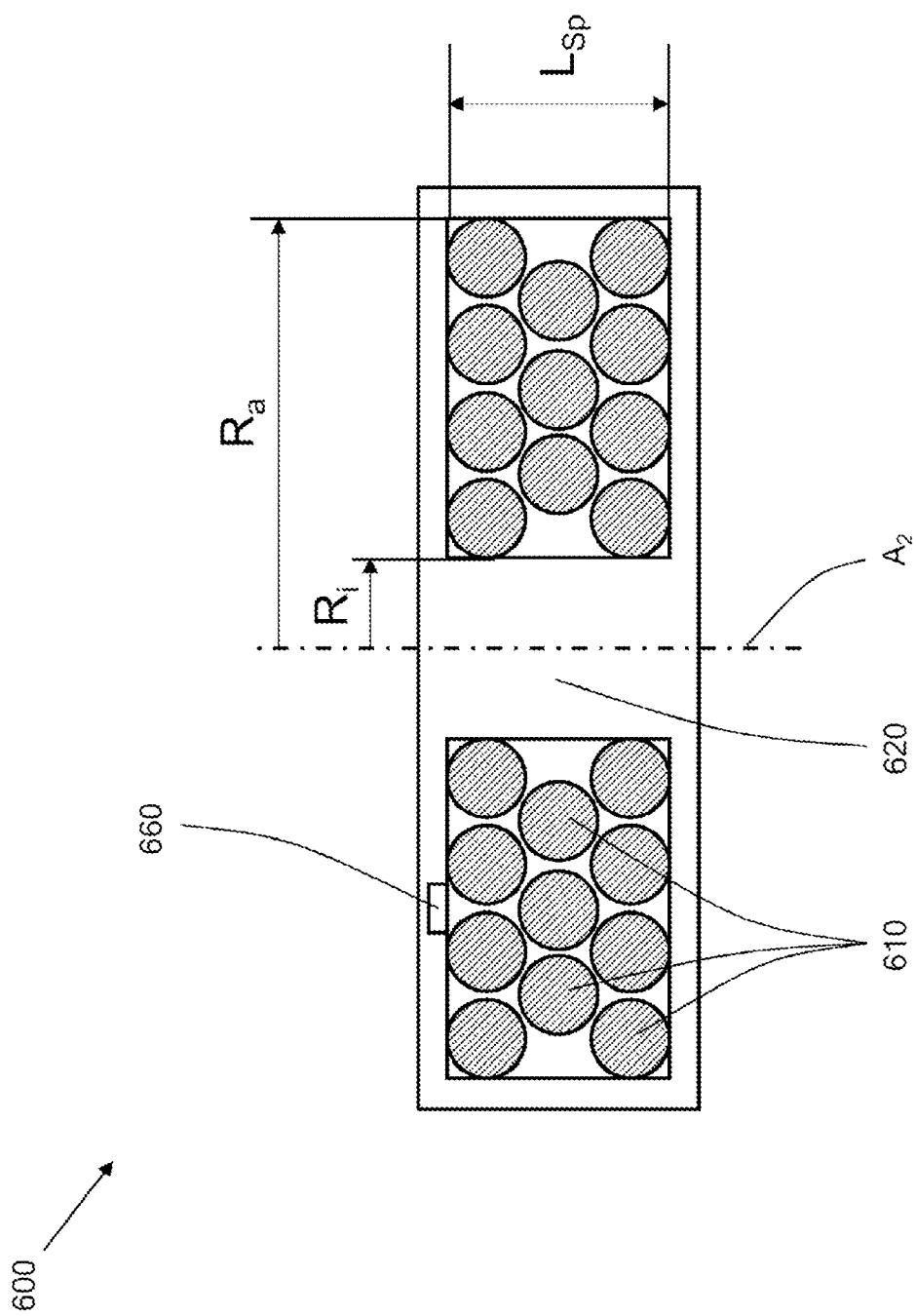
Figure 3:
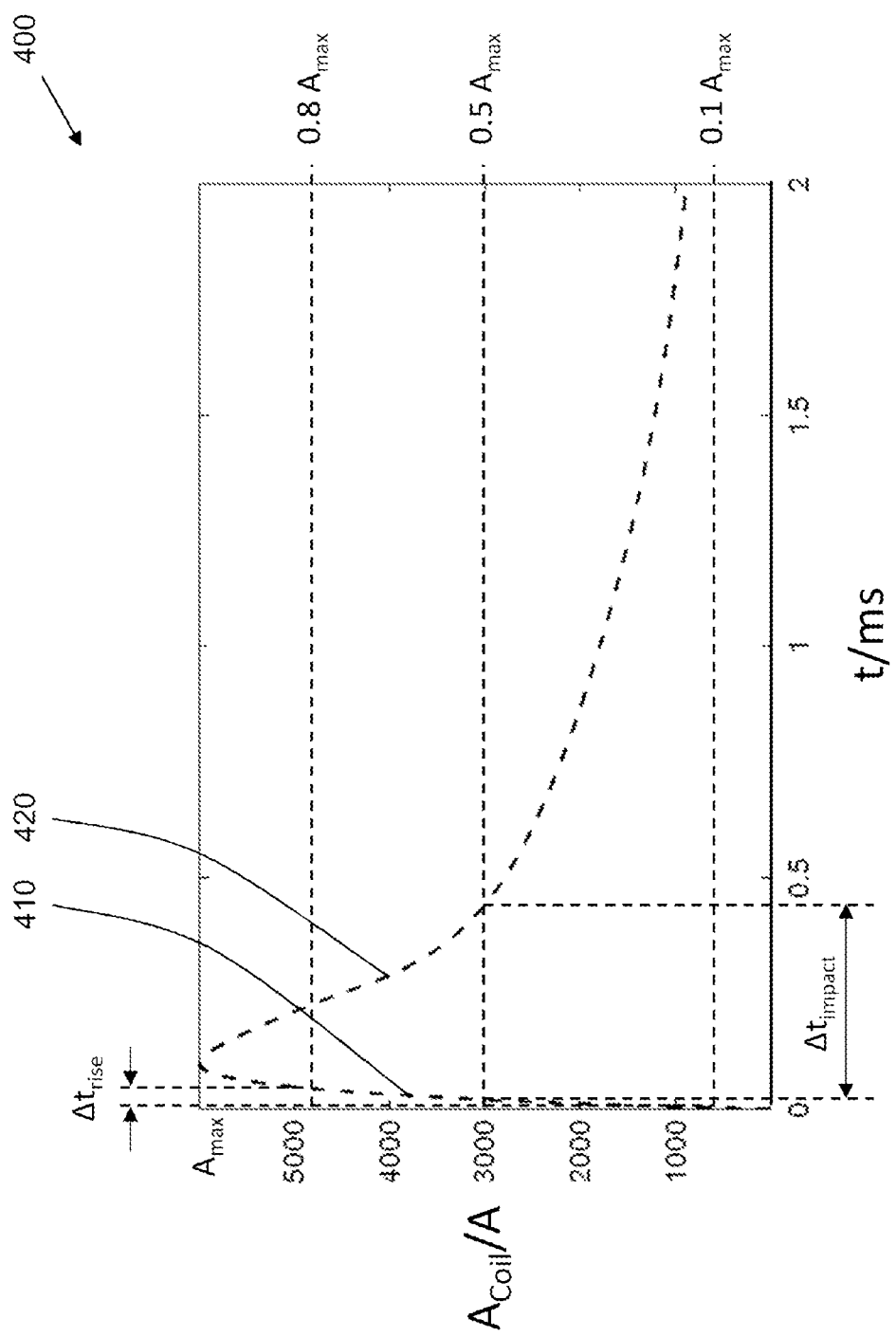
Figure 4:
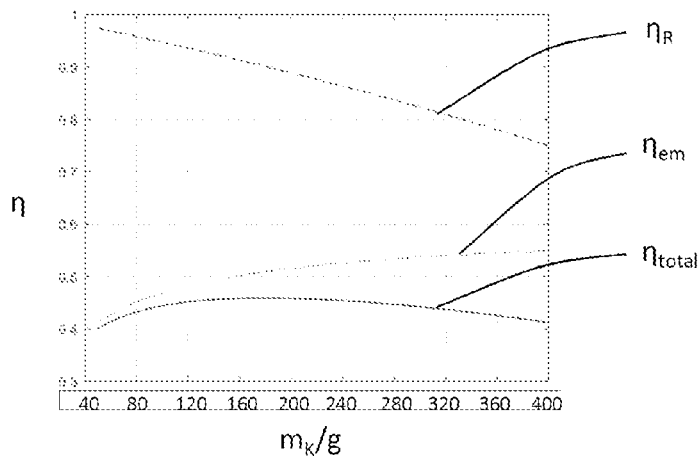
Figure 5:
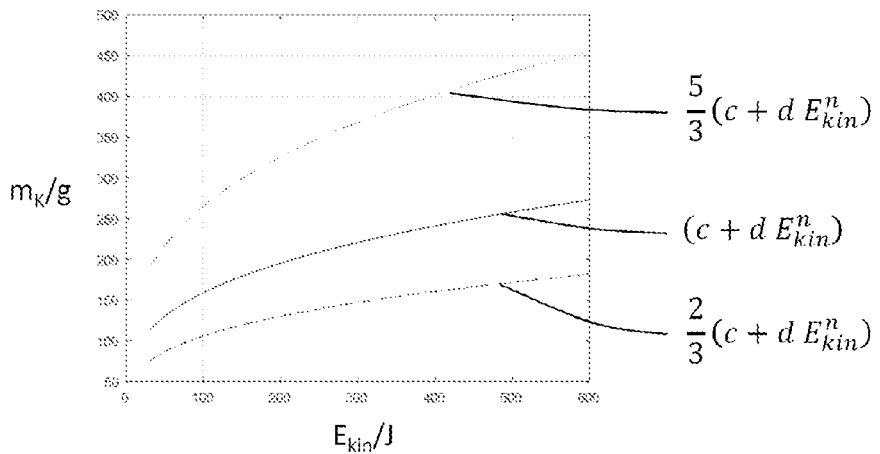
Figure 6:
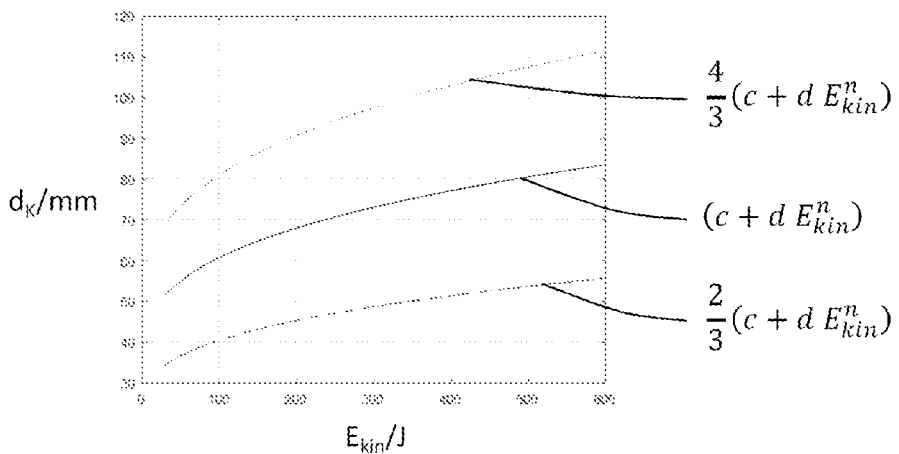

The invention is represented in a number of exemplary embodiments in the drawings, in which:

FIG. 1 shows a longitudinal section through a setting tool,
FIG. 2 shows a longitudinal section through an excitation coil,
FIG. 3 shows a time profile of a current intensity,
FIG. 4 shows an efficiency in dependence on a piston mass,
FIG. 5 shows a piston diameter in dependence on a setting energy and
FIG. 6 shows a piston mass in dependence on a setting energy.

FIG. 1 illustrates a hand-held setting tool 10 for driving fastening elements into a substrate that is not shown. The setting tool 10 has a holder 20 formed as a stud guide, in which a fastening element 30 formed as a nail is held in order to be driven into the substrate along a setting axis A (to the left in FIG. 1). For the purpose of supplying fastening elements to the holder, the setting tool 10 comprises a magazine 40 in which the fastening elements are held in store individually or in the form of a fastening element strip 50 and are transported to the holder 20 one by one. To this end, the magazine 40 has a spring-loaded feed element, not specifically denoted. The setting tool 10 has a drive-in element 60, which comprises a piston plate 70 and a piston rod 80. The drive-in element 60 is provided for transferring the fastening element 30 out of the holder 20 along the setting axis A into the substrate. In the process, the drive-in element 60 is guided with its piston plate 70 in a guide cylinder 95 along the setting axis A.

The driving-in element 60 is, for its part, driven by a drive which comprises a squirrel-cage rotor 90 which is arranged on the piston plate 70, an excitation coil 100, a soft-magnetic frame 105, a switching circuit 200 and a capacitor 300 with an internal resistance of 5 mOhm. The squirrel-cage rotor 90 consists of a preferably ring-like, particularly preferably circular ring-like, element with a low electrical resistance, for example made of copper, and is fastened, for example soldered, welded, adhesively bonded, clamped or connected in a form-fitting manner, to the piston plate 70 on the side of the piston plate 70 that faces away from the holder 20. In exemplary embodiments which are not shown, the piston plate itself is formed as a squirrel-cage rotor. The switching circuit 200 is provided for causing rapid electrical discharging of the previously charged capacitor 300 and conducting the thereby flowing discharge current through the excitation coil 100, which is embedded in the frame 105. The frame preferably has a saturation flux density of at least 1.0 T and/or an effective specific electrical conductivity of at most $10^6$ S/m, so that a magnetic field generated by the excitation coil 100 is intensified by the frame 105 and eddy currents in the frame 105 are suppressed.

In a ready-to-set position of the drive-in element 60 (FIG. 1), the drive-in element 60 enters with the piston plate 70 a ring-like recess, not specifically denoted, of the frame 105 such that the squirrel-cage rotor 90 is arranged at a small distance from the excitation coil 100. As a result, an excitation magnetic field, which is generated by a change in an electrical excitation current flowing through the excitation coil, passes through the squirrel-cage rotor 90 and, for its part, induces in the squirrel-cage rotor 90 a secondary electrical current, which circulates in a ring-like manner. This secondary current, which builds up and therefore changes, in turn generates a secondary magnetic field, which opposes the excitation magnetic field, as a result of which the squirrel-cage rotor 90 is subject to a Lorentz force, which is repelled by the excitation coil 100 and drives the drive-in element 60 toward the holder 20 and also the fastening element 30 held therein.

The setting device 10 further comprises a housing 110 in which the drive is held, a handle 120 with an operating element 130 which is designed as a trigger, an electrical energy store 140 which is designed as a rechargeable battery, a control unit 150, a tripping switch 160, a contact-pressure switch 170, a means for detecting a temperature of the excitation coil 100, which means is designed as a temperature sensor 180 which is arranged on the frame 105, and electrical connecting lines 141, 161, 171, 181, 201, 301 which connect the control unit 150 to the electrical energy store 140, to the tripping switch 160, to the contact-pressure switch 170, to the temperature sensor 180, to the switching circuit 200 and, respectively, to the capacitor 300. In exemplary embodiments which are not shown, the setting tool 10 is supplied with electrical energy by means of a power cable instead of the electrical energy store 140 or in addition to the electrical energy store 140. The control unit comprises electronic components, preferably interconnected on a printed circuit board to form one or more control circuits, in particular one or more microprocessors.

When the setting tool 10 is pressed against a substrate that is not shown (on the left in FIG. 1), a contact-pressure element, not specifically denoted, operates the contact-pressure switch 170, which as a result transmits a contact-pressure signal to the control unit 150 by means of the connecting line 171. This triggers the control unit 150 to initiate a capacitor charging process, in which electrical energy is conducted from the electrical energy store 140 to the control unit 150 by means of the connecting line 141 and from the control unit 150 to the capacitor 300 by means of the connecting lines 301, in order to charge the capacitor 300. To this end, the control unit 150 comprises a switching converter, not specifically denoted, which converts the electric current from the electrical energy store 140 into a suitable charge current for the capacitor 300. When the capacitor 300 is charged and the drive-in element 60 is in its ready-to-set position illustrated in FIG. 1, the setting tool 10 is in a ready-to-set state. Since charging of the capacitor 300 is only implemented by the setting tool 10 pressing against the substrate, to increase the safety of people in the area a setting process is only made possible when the setting tool 10 is pressed against the substrate. In exemplary embodiments which are not shown, the control unit already initiates the capacitor charging process when the setting tool is switched on or when the setting tool is lifted off the substrate or when a preceding driving-in process is completed.

When the operating element 130 is operated, for example by being pulled using the index finger of the hand which is holding the handle 120, with the setting tool 10 in the ready-to-set state, the operating element 130 operates the tripping switch 160, which as a result transmits a tripping signal to the control unit 150 by means of the connecting line 161. This triggers the control unit 150 to initiate a capacitor discharging process, in which electrical energy stored in the capacitor 300 is conducted from the capacitor 300 to the excitation coil 100 by means of the switching circuit 200 by way of the capacitor 300 being discharged.

To this end, the switching circuit 200 schematically illustrated in FIG. 1 comprises two discharge lines 210, 220, which connect the capacitor 300 to the excitation coil 200 and at least one discharge line 210 of which is interrupted by a normally open discharge switch 230. The switching circuit 200 forms an electrical oscillating circuit with the excitation coil 100 and the capacitor 300. Oscillation of this oscillating circuit back and forth and/or negative charging of the capacitor 300 may potentially have an adverse effect on the efficiency of the drive, but can be suppressed with the aid of a free-wheeling diode 240. The discharge lines 210, 220 are electrically connected, for example by soldering, welding, screwing, clamping or interlocking connection, to in each case one electrode 310, 320 of the capacitor 300 by means of electrical contacts 370, 380 of the capacitor 300 which are arranged on an end side 360 of the capacitor 300 that faces the holder 20. The discharge switch 230 is preferably suitable for switching a discharge current with a high current intensity and is formed for example as a thyristor. In addition, the discharge lines 210, 220 are at a small distance from one another, so that a parasitic magnetic field induced by them is as low as possible. For example, the discharge lines 210, 220 are combined to form a busbar and are held together by a suitable means, for example a retaining device or a clamp. In exemplary embodiments which are not shown, the free-wheeling diode is connected electrically in parallel with the discharge switch. In further exemplary embodiments which are not shown, there is no free-wheeling diode provided in the circuit.

For the purpose of initiating the capacitor discharging process, the control unit 150 closes the discharge switch 230 by means of the connecting line 201, as a result of which a discharge current of the capacitor 300 with a high current intensity flows through the excitation coil 100. The rapidly rising discharge current induces an excitation magnetic field, which passes through the squirrel-cage rotor 90 and, for its part, induces in the squirrel-cage rotor 90 a secondary electric current, which circulates in a ring-like manner. This secondary current which builds up in turn generates a secondary magnetic field, which opposes the excitation magnetic field, as a result of which the squirrel-cage rotor 90 is subject to a Lorentz force, which is repelled by the excitation coil 100 and drives the drive-in element 60 toward the holder 20 and also the fastening element 30 held therein. As soon as the piston rod 80 of the drive-in element 60 meets a head, not specifically denoted, of the fastening element 30, the fastening element 30 is driven into the substrate by the drive-in element 60. Excess kinetic energy of the drive-in element 60 is absorbed by a braking element 85 made of a spring-elastic and/or damping material, for example rubber, by way of the drive-in element 60 moving with the piston plate 70 against the braking element 85 and being braked by the latter until it comes to a standstill. The drive-in element 60 is then reset to the ready-to-set position by a resetting device that is not specifically denoted.

The capacitor 300, in particular its center of gravity, is arranged behind the drive-in element 60 on the setting axis A, whereas the holder 20 is arranged in front of the drive-in element 60. Therefore, with respect to the setting axis A, the capacitor 300 is arranged in an axially offset manner in relation to the drive-in element 60 and in a radially overlapping manner with the drive-in element 60. As a result, on the one hand a small length of the discharge lines 210, 220 can be realized, as a result of which their resistances can be reduced, and therefore an efficiency of the drive can be increased. On the other hand, a small distance between a center of gravity of the setting tool 10 and the setting axis A can be realized. As a result, tilting moments in the event of recoil of the setting tool 10 during a driving-in process are small. In an exemplary embodiment which is not shown, the capacitor is arranged around the drive-in element.

The electrodes 310, 320 are arranged on opposite sides of a carrier film 330 which is wound around a winding axis, for example by metallization of the carrier film 330, in particular deposited by evaporation, wherein the winding axis coincides with the setting axis A. In exemplary embodiments which are not shown, the carrier film with the electrodes is wound around the winding axis such that a passage along the winding axis remains. In particular, in this case the capacitor is for example arranged around the setting axis. The carrier film 330 has at a charging voltage of the capacitor 300 of 1500 V a film thickness of between 2.5 μm and 4.8 μm and at a charging voltage of the capacitor 300 of 3000 V a film thickness of for example 9.6 μm. In exemplary embodiments which are not shown, the carrier film is for its part made up of two or more individual films which are arranged as layers one on top of the other. The electrodes 310, 320 have a sheet resistance of 50 ohms/sq.

A surface of the capacitor 300 is in the form of a cylinder, in particular a circular cylinder, the cylinder axis of which coincides with the setting axis A. A height of this cylinder in the direction of the winding axis is substantially the same size as its diameter, measured perpendicularly to the winding axis. On account of a small ratio of height to diameter of the cylinder, a low internal resistance for a relatively high capacitance of the capacitor 300 and, not least, a compact construction of the setting tool 10 are achieved. A low internal resistance of the capacitor 300 is also achieved by a large line cross section of the electrodes 310, 320, in particular by a high layer thickness of the electrodes 310, 320, wherein the effects of the layer thickness on a self-healing effect and/or on a service life of the capacitor 300 should be taken into consideration.

The capacitor 300 is mounted on the rest of the setting device 10 in a manner damped by means of a damping element 350. The damping element 350 damps movements of the capacitor 300 relative to the rest of the setting tool 10 along the setting axis A. The damping element 350 is arranged on the end side 360 of the capacitor 300 and completely covers the end side 360. As a result, the individual windings of the carrier film 330 are subject to uniform loading by recoil of the setting tool 10. In this case, the electrical contacts 370, 380 protrude from the end surface 360 and pass through the damping element 350. For this purpose, the damping element 350 in each case has a clearance through which the electrical contacts 370, 380 protrude. The connecting lines 301 respectively have a strain-relief and/or expansion loop, not illustrated in any detail, for compensating for relative movements between the capacitor 300 and the rest of the setting tool 10. In exemplary embodiments which are not shown, a further damping element is arranged on the capacitor, for example on the end side of the capacitor that faces away from the holder. The capacitor is then preferably clamped between two damping elements, that is to say the damping elements bear against the capacitor with prestress. In further exemplary embodiments which are not shown, the connecting lines have a rigidity which continuously decreases as the distance from the capacitor increases.

FIG. 2 illustrates a longitudinal section through an excitation coil 600. The excitation coil 600 comprises an electrical conductor, preferably made of copper, with a circular cross section, for example, which is wound in several turns 610 around a setting axis $A_2$. Overall, the excitation coil has a substantially cylindrical, in particular circular-cylindrical, outer shape with an outside diameter $R_a$ and a coil length $L_{Sp}$ in the direction of the setting axis $A_2$. In a region that is radially inner with respect to the setting axis $A_2$, the excitation coil 600 has a free space 620, which is preferably likewise cylindrical, in particular circular-cylindrical, and defines an inside diameter $R_i$ of the excitation coil 600. This results in a self-inductance of the coil of $$L_{Coil} = \mu_0 n_W^2 \frac{r_{Sp}^2 \pi}{L_{Sp} + 0.9 r_{Sp}}$$

with the induction constant $$\mu_0 = 4\pi \cdot 10^{-7} \frac{Vs}{Am},$$

a number $n_W$ of the turns of the excitation coil 600 and an average coil radius $$r_{Sp} = \frac{1}{2}(R_i + R_a).$$

Since the excitation coil 600 is in a magnetically saturated area during operation of the setting tool, the permeability number $\mu_r$ of the excitation coil 600 is to be set as $\mu_r=1$, so that the self-inductance can be calculated from the number of turns and the dimensions of the excitation coil 600.

A means formed as a temperature sensor 660 for detecting a temperature of the excitation coil 600 is arranged on an axial end face of the excitation coil 600 with respect to the setting axis $A_2$ and is connected in a thermally conducting manner to the excitation coil 600, for example by means of a thermal paste. In exemplary embodiments which are not shown, the temperature sensor is arranged on an inner circumference or outer circumference of the excitation coil.

FIG. 3 illustrates a time profile 400 of a current intensity $A_{coil}$ of a current flowing through an excitation coil during the discharge of a capacitor in a setting tool according to the invention. The current intensity $A_{coil}$ is given in amperes and is plotted against a time t in milliseconds. The time profile 400 of the current intensity $A_{coil}$ has a rising edge 410, a maximum current intensity $A_{max}$ of approximately 6000 A and a falling edge 420. Within the rising edge 410, the current intensity $A_{coil}$ rises during a current rise time $\Delta t_{rise}$ from 0.1 times to 0.8 times the maximum current intensity $A_{max}$. During an impact time $\Delta t_{impact}$, the current intensity $A_{Coil}$ is more than 0.5 times the maximum current intensity $A_{max}$.

In the present exemplary embodiment, the current rise time $\Delta t_{rise}$ is approximately 0.05 ms and the impact time $\Delta t_{impact}$ is approximately 0.4 ms. If the current rise time $\Delta t_{rise}$ and the impact time $\Delta t_{impact}$ are chosen too small, the maximum current intensity $A_{max}$ must be increased to ensure the same setting energy. However, this causes an increases in thermal load on the excitation coil and thus a reduction in the efficiency of the drive. If the current rise time $\Delta t_{rise}$ and the impact time $\Delta t_{impact}$ are chosen too large, the drive-in element moves so far away from the excitation coil already in the rising edge 410 that the repulsive force acting on the squirrel-cage rotor is reduced, which likewise lowers the efficiency of the drive.

With a cross-sectional area of the excitation coil of for example 3 mm², a maximum current density in the excitation coil during the discharge of the capacitor is approximately 2000 A/mm². If the maximum current density in the excitation coil is selected too low, the setting energy that can be achieved with an otherwise unchanged setting tool is reduced. To compensate for this, for example, the capacitor or the excitation coil must be enlarged, which would however increase the weight of the setting tool. If the maximum current density in the excitation coil is selected too high, a thermal load on the excitation coil increases, with the result that the efficiency of the drive is reduced.

The capacitor and the excitation coil are arranged in an electrical oscillating circuit with a total resistance $R_{total}$. The capacitor has a capacitance $C_{cap}$ and a capacitor resistance $R_{cap}$. The excitation coil has a self-inductance $L_{coil}$ and a coil resistance $R_{coil}$. A ratio of the capacitor resistance $R_{Cap}$ to the total resistance $R_{total}$ is 0.14. If the ratio of the capacitor resistance $R_{cap}$ to the total resistance $R_{total}$ is selected to be too large, a relatively large amount of heat loss occurs in the capacitor, as a result of which the efficiency of the drive is reduced.

A coil time constant $\tau_{coil}$ of the excitation coil results from a ratio of the self-inductance $L_{coil}$ to the coil resistance $R_{coil}$ and is for example 1000 $\mu H/\Omega$ or 1 ms. If the coil time constant $\tau_{coil}$ chosen too small, a current flow in the excitation coil increases too quickly, which reduces the efficiency of the drive. If the coil time constant $\tau_{coil}$ is chosen too large, the current flow through the excitation coil is distributed over a relatively great period of time. This results in a reduced maximum current intensity $A_{max}$, which reduces the efficiency of the drive.

In addition, the capacitor has a capacitor time constant $\tau_{cap}=C_{cap} R_{cap}$ and the excitation coil has a coil time constant $\tau_{coil}=L_{coil}/R_{coil}$, wherein a ratio of the coil time constant $\tau_{coil}$ to the capacitor time constant $\tau_{cap}$ is approximately 150. If the ratio of the time constants is chosen too small, a relatively large amount of heat loss occurs in the capacitor, which reduces the efficiency of the drive.

FIG. 4 illustrates an efficiency $\eta$ of a drive of a setting tool in dependence on a piston mass $m_K$ of a drive-in element with a setting energy $E_{kin}$ of 125 J. The efficiency $\eta$ has no unit, the piston mass $m_K$ is given in grams. A total efficiency $\eta_{total}$ of the drive results from a product of a recoil efficiency $\eta_R$ and an electromagnetic efficiency $\eta_{em}$. The recoil efficiency $\eta_R$ decreases with increasing piston mass $m_K$, since, with the same setting energy $E_{kin}$, an energy of a recoil of the setting tool increases with increasing piston mass $m_K$ and this recoil energy is lost. The electromagnetic efficiency $\eta_{em}$ increases with increasing piston mass $m_K$, since, with the same setting energy $E_{kin}$, an acceleration of the drive-in element decreases with increasing piston mass $m_K$ and thus a length of time for the drive-in element in the area of influence of the excitation coil increases. The piston mass $m_K$ at which the total efficiency $\eta_{total}$ of the drive is at a maximum can be determined as $$m_K=(c+d\ E_{kin}^{\ n})$$

where c=20 g, d=30 gJ$^{-n}$ and n=⅓. In the present example ($E_{kin}$=125 J), the piston mass $m_K$=170 g.

FIG. 5 illustrates the relationship described above of the piston mass $m_K$ with the setting energy $E_{kin}$. As described in connection with FIG. 4, outside the range according to the invention, the total efficiency $\eta_{total}$ of the drive decreases $$\frac{2}{3}(c+dE_{kin}^n) \leq m_K \leq \frac{5}{3}(c+dE_{kin}^n)$$

significantly.

By analogy with FIG. 4, the recoil efficiency $\eta_R$ also decreases with increasing piston diameter $d_K$, since, with increasing piston diameter $d_K$, the piston mass $m_K$ increases. Furthermore, the electromagnetic efficiency $\eta_{em}$ increases with increasing piston diameter $d_K$, since, with increasing piston diameter $d_K$, a diameter of the squirrel-cage rotor increases, so that a repulsive force between the excitation coil and the squirrel-cage rotor also increases. The piston diameter $d_K$ at which the total efficiency $\eta_{total}$ of the drive is at a maximum for a given setting energy $E_{kin}$ can be determined as $$d_K=(a+b\ E_{kin}^{\ n})$$

where a=33 mm, b=6 mmJ$^{-n}$ and n=⅓. In the present example ($E_{kin}$=125 J), the piston diameter $d_K$=63 mm.

FIG. 6 illustrates the relationship described above between the piston diameter $d_K$ and the setting energy $E_{kin}$. As described above, outside the range according to the invention, the total efficiency $\eta_{total}$ of the drive decreases $$\frac{2}{3}(a+bE_{kin}^n) \leq d_K \leq \frac{4}{3}(a+bE_{kin}^n)$$

significantly.

The invention has been described using a series of exemplary embodiments that are illustrated in the drawings and exemplary embodiments that are not illustrated. The individual features of the various exemplary embodiments are applicable individually or in any desired combination with one another, provided that they are not contradictory. It should be noted that the setting tool according to the invention can also be used for other applications.

The invention claimed is:

1. A setting tool for driving fastening elements into a substrate, comprising a holder for holding a fastening element; a drive in element for transferring a fastening element held in the holder into the substrate along a setting axis by a setting energy $E_{kin}$; and, a drive for driving the drive-in element toward the fastening element along the setting axis, wherein the drive comprises an electrical capacitor, a squirrel-cage rotor arranged on the drive-in element, and an excitation coil; wherein current flows through the excitation coil during discharge of the electrical capacitor and generates a magnetic field that accelerates the drive-in element toward the fastening element, wherein a current intensity $A_{coil}$ of the current flowing through the excitation coil during the discharge of the electrical capacitor has a time profile with a rising edge, a maximum current intensity $A_{max}$ and a falling edge, wherein the current intensity $A_{coil}$ rises during a current rise time $\Delta t_{rise}$ from 0.1 times to 0.8 times the maximum current intensity $A_{max}$ and during an impact time $\Delta t_{impact}$ is more than 0.5 times the maximum current intensity $A_{max}$ but not greater than the maximum current intensity $A_{max}$, and wherein the current rise time $\Delta t_{rise}$ is at least 0.020 ms and at most 0.275 ms and/or the impact time $\Delta t_{impact}$ is at least 0.15 ms and at most 2.0 ms.

2. The setting tool as claimed in claim 1, wherein the current rise time $\Delta t_{rise}$ is at least 0.05 ms and at most 0.2 ms and/or the impact time $\Delta t_{impact}$ is at least 0.2 ms and at most 1.6 ms.

3. The setting tool as claimed in claim 1, wherein a maximum current density in the excitation coil during the discharge of the electrical capacitor is at least 800 A/mm² and at most 3200 A/mm².

4. The setting tool as claimed in claim 1, wherein the electrical capacitor and the excitation coil are arranged in an electrical oscillating circuit, and wherein the electrical capacitor has a capacitance $C_{cap}$ and an electrical capacitor resistance $R_{cap}$, the excitation coil has a self-inductance $L_{coil}$ and a coil resistance $R_{coil}$ and the electrical oscillating circuit has a total resistance $R_{total}$.

5. The setting tool as claimed in claim 4, wherein a ratio of the electrical capacitor resistance $R_{cap}$ to the total resistance $R_{total}$ is at most 0.6.

6. The setting tool as claimed in claim 4, wherein a ratio of the self-inductance $L_{coil}$ to the coil resistance $R_{coil}$ is at least 800 µH/Ω and at most 4800 µH/Ω.

7. The setting tool as claimed in claim 4, wherein the electrical capacitor has an electrical capacitor time constant $\tau_{cap}=C_{cap} R_{cap}$ and the excitation coil has a coil time constant $\tau_{coil}=L_{coil}/R_{coil}$, and wherein a ratio of the coil time constant $\tau_{coil}$ to the electrical capacitor time constant $\tau_{cap}$ is at least 10.

8. The setting tool as claimed in claim 1, wherein the drive-in element is provided for transferring a fastening element held in the holder into the substrate with a setting energy $E_{kin}$ of at least 30 J and at most 600 J, wherein the drive-in element has a piston diameter $d_K$ and a piston mass $m_K$ and wherein, for the piston diameter $d_K$ $$\frac{2}{3}(a + bE_{kin}^n) \leq d_K \leq \frac{4}{3}(a + bE_{kin}^n)$$

where a=33 mm, b=6 mmJ$^{-n}$ and n=⅓ and/or, for the piston mass $m_K$, $$\frac{2}{3}(c + dE_{kin}^n) \leq m_K \leq \frac{5}{3}(c + dE_{kin}^n)$$

where c=20 g, d=30 gJ$^{-n}$ and n=⅓.

9. The setting tool of claim 1, comprising a hand-held setting tool.

10. The setting tool of claim 5, wherein the ratio of $R_{cap}$ to $R_{total}$ is at most 0.5.

11. The setting tool as claimed in claim 5, wherein a ratio of the self-inductance $L_{coil}$ to the coil resistance $R_{coil}$ is at least 800 µH/Ω and at most 4800 µH/Ω.

12. The setting tool as claimed in claim 5, wherein the electrical capacitor has an electrical capacitor time constant $\tau_{cap}=C_{cap} R_{cap}$ and the excitation coil has a coil time constant $\tau_{coil}=L_{coil}/R_{coil}$, and wherein a ratio of the coil time constant $\tau_{coil}$ to the electrical capacitor time constant $\tau_{cap}$ is at least 10.

13. The setting tool as claimed in claim 6, wherein the electrical capacitor has an electrical capacitor time constant $\tau_{cap}=C_{cap} R_{cap}$ and the excitation coil has a coil time constant $\tau_{coil}=L_{coil}/R_{coil}$, and wherein a ratio of the coil time constant $\tau_{coil}$ to the electrical capacitor time constant $\tau_{cap}$ is at least 10.

14. The setting tool as claimed in claim 2, wherein a maximum current density in the excitation coil during the discharge of the electrical capacitor is at least 800 A/mm² and at most 3200 A/mm².

15. The setting tool as claimed in claim 2, wherein the electrical capacitor and the excitation coil are arranged in an electrical oscillating circuit, and wherein the electrical capacitor has a capacitance $C_{cap}$ and an electrical capacitor resistance $R_{cap}$, the excitation coil has a self-inductance $L_{coil}$ and a coil resistance $R_{coil}$ and the electrical oscillating circuit has a total resistance $R_{total}$.

16. The setting tool as claimed in claim 3, wherein the capacitor and the excitation coil are arranged in an electrical oscillating circuit, and wherein the electrical capacitor has a capacitance $C_{cap}$ and an electrical capacitor resistance $R_{cap}$, the excitation coil has a self-inductance $L_{coil}$ and a coil resistance $R_{coil}$ and the electrical oscillating circuit has a total resistance $R_{total}$.

17. The setting tool as claimed in claim 15, wherein a ratio of the electrical capacitor resistance $R_{cap}$ to the total resistance $R_{total}$ is at most 0.6.

18. The setting tool as claimed in claim 16, wherein a ratio of the electrical capacitor resistance $R_{cap}$ to the total resistance $R_{total}$ is at most 0.6.

19. The setting tool as claimed in claim 15, wherein a ratio of the self-inductance $L_{coil}$ to the coil resistance $R_{coil}$ is at least 800 µH/Ω and at most 4800 µH/Ω.

20. The setting tool as claimed in claim 16, wherein a ratio of the self-inductance $L_{coil}$ to the coil resistance $R_{coil}$ is at least 800 µH/Ω and at most 4800 µH/Ω.

* * * * *